United States Patent [19]
Collier et al.

[11] Patent Number: 4,631,823
[45] Date of Patent: Dec. 30, 1986

[54] ELECTRICAL HARNESS MANUFACTURING METHOD AND APPARATUS

[75] Inventors: John C. Collier, York; George B. Bakowicz, Harrisburg, both of Pa.

[73] Assignee: Burndy Corporation, Norwall, Conn.

[21] Appl. No.: 587,842

[22] Filed: Mar. 12, 1984

Related U.S. Application Data

[63] Continuation of Ser. No. 235,611, Feb. 19, 1981, abandoned.

[51] Int. Cl.⁴ ............... H01R 43/04; B23P 23/00
[52] U.S. Cl. .................. 29/867; 29/564.4; 29/701; 81/9.51
[58] Field of Search ............ 29/859, 857, 811, 862, 29/863, 864, 867, 748, 751, 564.4; 81/9.51

[56] References Cited

U.S. PATENT DOCUMENTS

```
1,396,903  11/1921  Weber .
2,934,982   5/1960  Eubanks .
3,095,768   7/1963  Walstrom .
3,267,556   8/1966  Scharf ................. 81/9.51 X
3,309,948   3/1967  Falken ................. 81/9.51
3,363,309   1/1968  Logan et al. .......... 81/9.51 X
3,364,801   1/1968  Johnston .
3,769,681  11/1973  Eubanks .
3,895,426   7/1975  Papsdorf .............. 81/9.51 X
4,261,231   4/1981  Bleakley .............. 81/9.51
4,294,006  10/1981  Bair et al. ............ 29/701
```

Primary Examiner—Howard N. Goldberg
Assistant Examiner—Carl J. Arbes
Attorney, Agent, or Firm—Perman & Green

[57] ABSTRACT

A method and apparatus for automatically making harnesses such as those used for electrically interconnecting a plurality of spaced-apart, separate connection points. Insulated wire is fed through a press position where terminals are attached to the wire conductor. The insulation is displaced from a portion of the wire where a terminal is to be attached, thereby baring the conductor. A terminal is brought adjacent the bared conductor from a supply of terminals and crimped to the conductor. A wire feeding mechanism advances the wire so that the section having a terminal crimped thereto is removed from the press position and a new portion is brought into the press position for the attachment of another terminal. The automatic process is repeated until a pre-determined number of terminals are attached to the conductor at which time the wire can be severed to complete the manufacture of the harness. The apparatus has a control means which is programmable so that one of a variety of harness configurations can be set up and manufactured repetitively. The control means also enables the apparatus to operate in different modes such as one-step, one-cycle or continuous-cycle.

19 Claims, 10 Drawing Figures

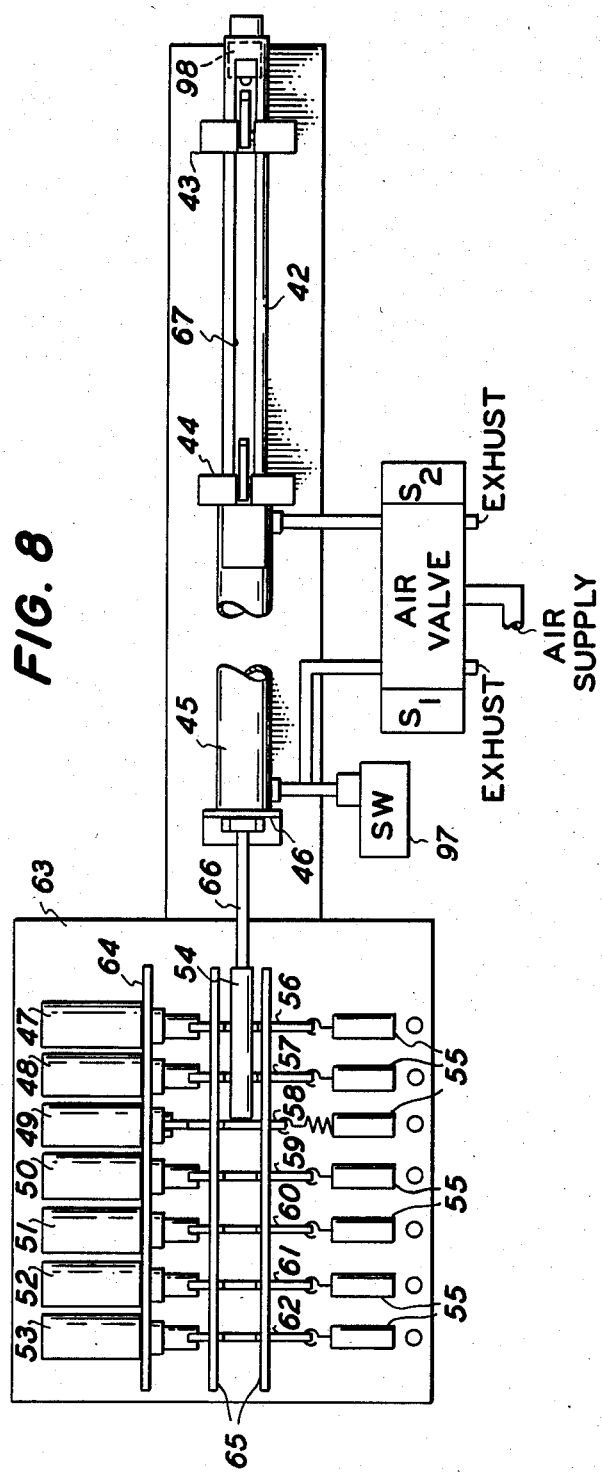
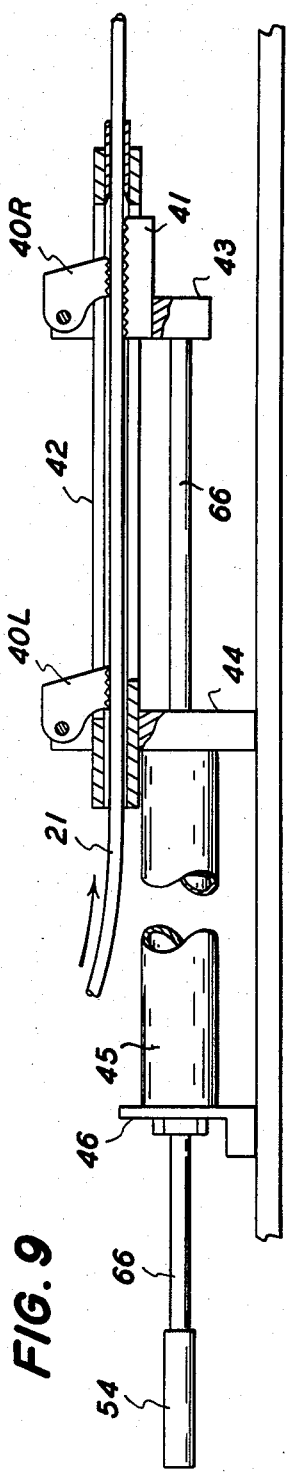
FIG. 8
FIG. 9

ELECTRICAL HARNESS MANUFACTURING METHOD AND APPARATUS

This is a continuation of patent application Ser. No. 235,611, filed Feb. 19, 1981, now abondoned.

BACKGROUND OF THE INVENTION

This invention relates generally to a method and apparatus for making electrical harnesses having a pre-determined number of terminals, and more particularly, to an automatic method and apparatus for positioning at a terminating station each portion of the wire to have a terminal attached, displacing the insulation from that portion of the wire's conductor to bare the underlying conductor, attaching a terminal to the conductor, and cutting off the wire from its supply or otherwise removing the wire from the apparatus to complete the harness after the pre-determined number of terminals have been attached.

Lead wires are commonly used to make interconnections between two separate and spaced-apart contact points. The electrical connections are made by placing the lead wire terminal connector onto the electrical unit's mating connector which is located on the outside of the unit. The lead wire terminal connector typically is a female member and the electrical unit's connector is a male member, such as a blade contact. Electrical connections are made quickly and simply by slipping the female member onto the blade contact. Such lead wire interconnections are used, for example, in control panels such as those in household appliances wherein several switches, indicator lights, etc., are clustered together and require interconnection to a common power source.

In the prior art, lead wires are typically made by cutting electrical wire into specific lengths, stripping the insulation from the ends of the wire conductor and attaching terminals to the ends of the conductor. In more automated prior art devices, a continuous length of insulated wire has its insulation removed at spaced locations and then the wire is cut into specific lengths where the insulation has been removed. This produces specific lengths of wire with a bared conductor at each end to which a terminal can be attached. U.S. Pat No. 3,364,801 is an example of this process wherein the wire is fed from a supply reel and the removal of the insulation is controlled electronically. U.S. Pat. No. 3,769,681 discloses a high speed wire cutter for forming specific lengths of wire and an insulation stripping apparatus joined by a conveyor with a terminal device for attaching terminals to the end of the wire. Several other automatic devices for performing center stripping, cutting and feeding of wire in various sequential combinations for lead wires with terminals on their ends have been disclosed. Examples of these are U.S. Pat. Nos. 2,934,982 and 3,162,391. U.S. Pat. No., 3,095,768 shows a tape control version of these operations. Hand tools also are known which physically remove insulation from the ends of wire. Such a tool is disclosed in U.S. Pat. No. 1,396,903.

Lead wires, per se, have been replaced by electrical harness units where appropriate. Harnesses, which represent a different approach to electrical interconnecting, are particularly useful in an environment where the electrical units to be interconnected are many and fairly close to one another. The terminals are spaced on the harness unit to match the spacing between the electrical unit's contact points that are to be interconnected. One example of such a harness is the "daisy chain" type of harness wherein a number of terminal connectors are joined together by a section of insulated wire. The terminals are spaced from one another by predetermined distances to accommodate the distance between the contact points to which they are to be attached. In this type of harness, the electrical current can be applied at one end of the harness and fed to all of the terminals directly through the harness. The main advantages of this type of harness is that it is relatively easy to install and it takes up less room when compared to the individual lead wire approach.

One drawback with such harnesses, however, is that there is not available a truly automatic way of repetitively manufacturing the complete harness. At the present time, harnesses are manufactured in a number of individual operations, many of which are manual in nature. Because of this, harnesses are relatively expensive and time-consuming to manufacture. In addition, there is a need for many different types of harnesses and the changeover from one harness configuration to another in the manufacturing environment is also time-consuming and expensive.

Harnesses are also typically made up of individual sections of insulated wire resulting in a large number of electrical discontinuities in the harness unit. Discontinuities are those areas at which the wire is broken to have a terminal connected thereto. These are particularly to be avoided in electrical interconnections because of their greater potential to fail. They generate greater temperatures and, consequently, can cause the circuits to rapidly deteriorate and become inoperative.

Accordingly, it is a primary object of the present invention to improve the method and apparatus for manufacturing electrical harnesses.

It is another object of the present invention to substantially reduce the number of discontinuities in electrical harnesses.

It is another object of the present invention to provide a pre-programmable automatic machine to manufacture electrical harnesses.

It is another object of the present invention to lower production costs in the manufacture of electrical harnesses.

It is another object of the present invention to save space in the manufacturing of electrical harnesses.

It is another object of the present invention to improve the quality of electrical harnesses.

It is another object of the present invention to manufacture electrical harnesses which are easier to route and trace to the contact points.

It is another object of the present invention to improve the speed at which electrical harnesses can be manufactured.

It is another object of the present invention to provide a harness manufacturing method and apparatus which can be rapidly modified in changing from one harness configuration to another.

SUMMARY OF THE INVENTION

Briefly stated, and in accordance with the present invention, an automatic method and apparatus for making electrical harnesses is disclosed herein. The system includes an insulated wire supply, a wire feed station, a terminating station and a control means to assure that each harness made is a duplicate of the configuration desired. A press functions to slice through the insulation of the wire in the area that a terminal is to be attached and displace the insulation along the wire so that the underlying conductor is bared. The press automatically locates a terminal under the bared portion of the conductor and attaches the terminal to the conductor. At the end of the harness manufacturing process, the press cuts off the completed harness from the supply of wire. The wire is fed from and through a wire feeding device so that the spacing between the terminals applied at the press is controlled in accordance with a predetermined program. The control means is programmed to operate the wire feed and terminating means to produce a completed harness of a predetermined configuration and can be quickly re-programmed to accommodate harnesses of varying configurations. The control means also allows the device to be operated in three modes; one-step, one-cycle and continuous cycle.

BRIEF DESCRIPTION OF THE DRAWINGS

Other objects and advantages of the present invention will become apparent upon reading the following detailed description with reference to the drawings wherein:

FIG. 8 is a top view of the wire feed station and the wire feed length control station.

FIG. 9 is a side view of the wire feed station.

While the present invention is described in connection with the preferred embodiment and associate method of use thereof, it is to be understood that it is not intended to limit the invention to this embodiment and method of use. On the contrary, it is intended to cover all alternatives, modifications and equivalents which may be included within the spirit and scope of the invention as defined in the appended claims.

DETAILED DESCRIPTION OF THE INVENTION

The method and apparatus disclosed herein relate to the manufacture of harnesses. The term "harness" in its broad meaning refers to a length of any suitable wire having one or more suitable connectors thereon. The specific embodiment disclosed hereinafter is an electrical harness. In this embodiment, the harness includes a length of wire containing an electrical conductor shielded by insulating material. One or more electrical terminals are connected to the conductor along the wire in a position between the ends of the wire. Although any suitable terminal can be used, a flag-type terminal is shown and described herein for the purposes of this description. The term "harness configuration" relates to the general shape and size of the harness after manufacture as well as the type of connectors and their relative spacing on the harness.

The apparatus and method described herein enables a harness to be manufactured in one continuous, automatic process. Additionally, because of the specific mechanisms used, the harness can be manufactured without any discontinuities or breaks in the conductor whatsoever. The process and apparatus have maximum production flexibility in that the control means enables an operator to simply, accurately and rapidly set up the automatic mechanism for a very great number of different harness configurations.

Figure 1:
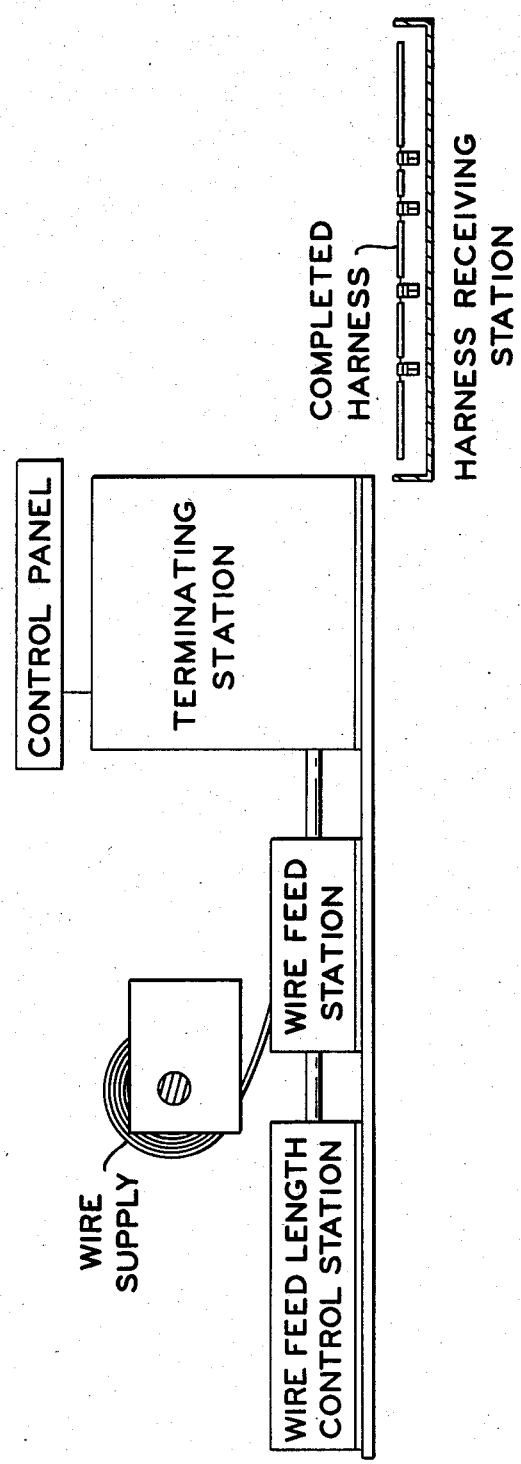
FIG. 1 illustrates schematically the subsystems of the harness making machine and method.

Referring more particularly to the drawings, wherein to the extent possible like reference numerals have been used to designate like elements, FIG. 1 schematically illustrates the sub-systems of the harness making equipment utilizing systematic sequential technology. The sub-systems comprise a terminating station, a wire feed station which includes a wire supply providing an endless source of wire such as from a supply reel, a wire feed length control station, a harness receiving station and a control panel. Although FIG. 1 shows a simple collection area as the harness receiving station, any suitable device for receiving the harnesses could be employed. For instance, it is contemplated that harnesses could be wound onto a reel after leaving the terminating station. When desirable, the harnesses need not be severed from one another before being wound on the reel or the like. In this embodiment, the cutting of the individual harness can be carried out as they are being installed rather than before being placed on the reel.

The terminating station can include suitable devices for stripping the wire of insulation, supplying terminals, attaching terminals to the wire, cutting terminals from a strip thereof and cutting the harness from the wire supply. The term "stripping" is used generically herein to mean the removal of insulation from that portion of the conductor to which a terminal is to be attached. The particular manner of stripping described in conjunction with the figures is displacement of the insulation substantially along the wire to provide a bared portion of the conductor.

The device for supplying, attaching and cutting off terminals in the terminating station, hereinafter referred to generally as a press, can be of any suitable type available. One such device is the Burndy Universal Terminating Machine, "UTM", manufactured by Burndy Corporation, Norwalk, Conn. This type of press automatically feeds a strip of terminals to a crimping station which includes an anvil and crimping blade mounted on a ram. When a wire is placed in the anvil area, the ram is cycled so that the crimping blade falls onto the first terminal fed to the anvil area and then crimps it onto the wire. A severing blade also is activated by the ram which severs the first terminal from the strip. The ram then ascends to its original position to complete its cycle.

The press can include a clutch and a timing shaft to control its operating cycle. The shaft has timing cams located thereon which interact with suitable cam follower or valve switch assemblies for maintaining proper timing. In the particular embodiment disclosed herein, the stripper also functions as a wire cutter. The wire feed station contains apparatus to feed wire so as to locate the proper portion of the wire in the press for the attachment of a terminal. The wire feed length control station determines the length of wire fed by the wire feed station. The control panel provides appropriate signals to and timing of these stations to produce a harness of predetermined configuration automatically.

Figure 2:
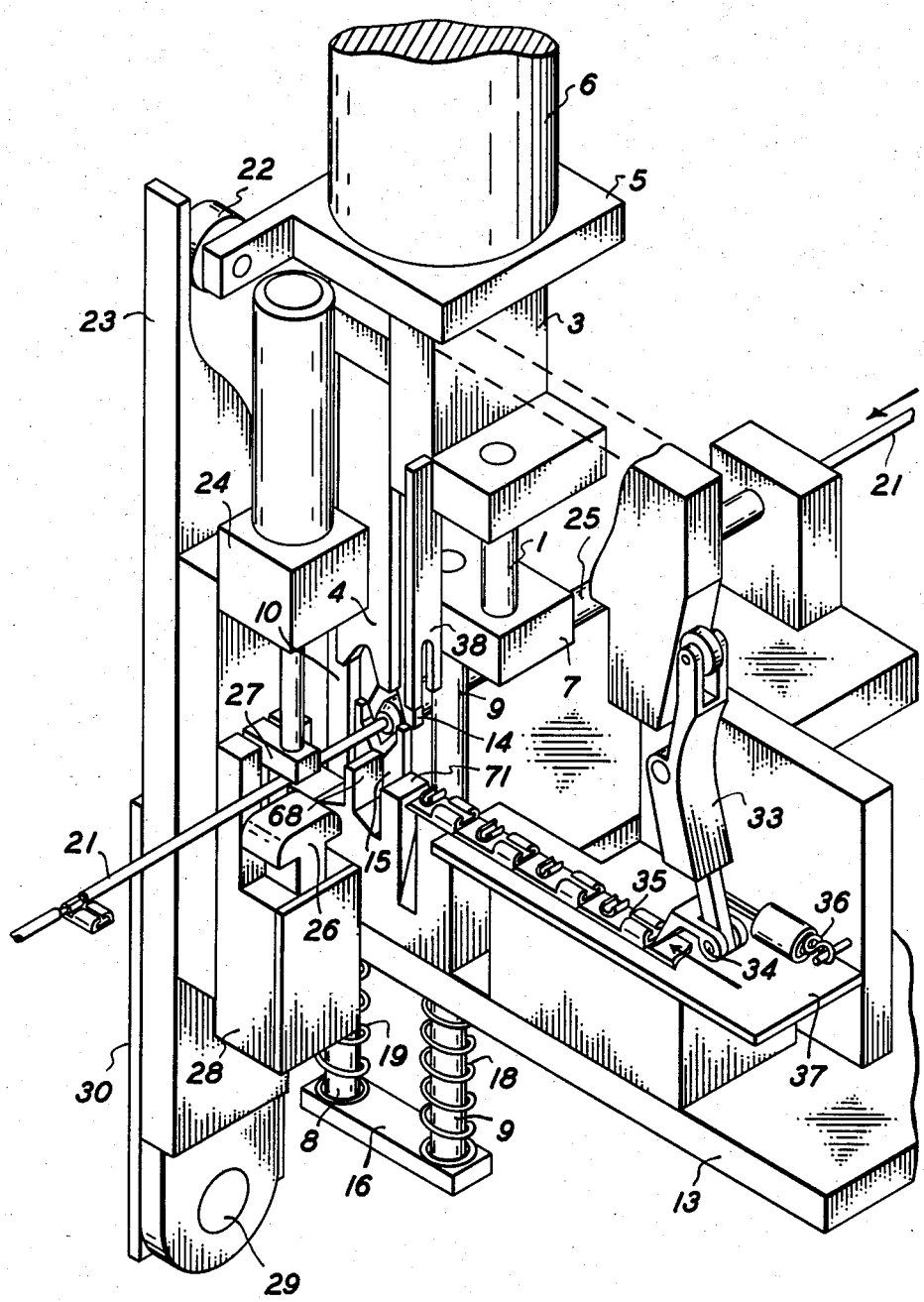
FIG. 2 is a perspective view of the wire terminating station showing the mechanism for insulation stripping, terminal feeding and terminal crimping.

Referring to FIG. 2, which is a perspective view of the major components of the terminating station, the following elements are part of a standard press. A strip of terminals 35 is fed on terminal feed base 37 to crimping anvil 68. The terminals are urged to the crimping area by terminal feed finger 34 which is controlled by the movement of terminal feed actuating cam follower 33. Follower 33 is biased by feed finger return spring 36 and follows terminal feed actuating cam 32 which moves with the action of ram 6. This assemblage of components urges a terminal into the crimping area at the proper time for crimping to wire 21.

Figure 3:
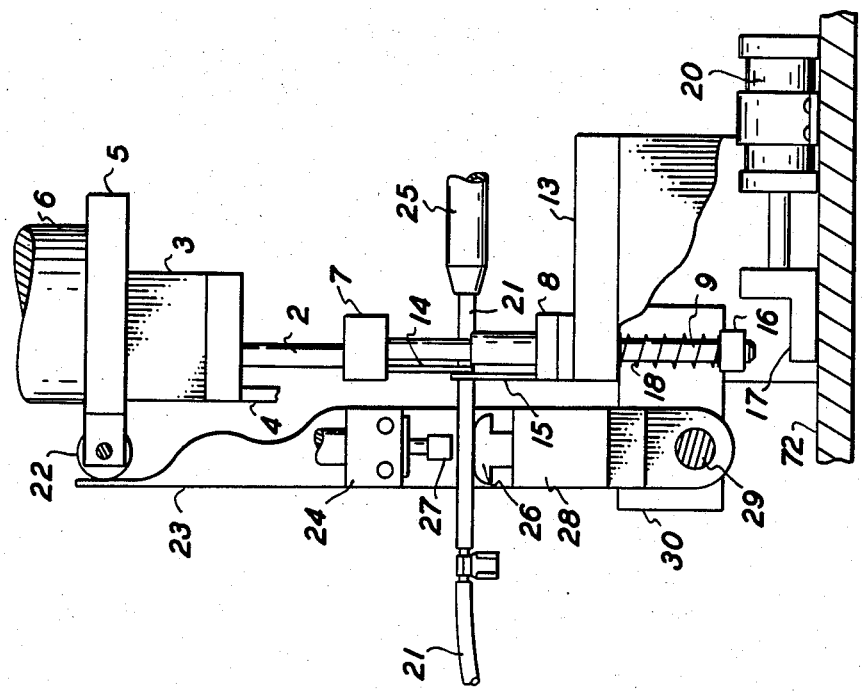
FIG. 3 is a front view of the wire stripping mechanism showing the position of the stripping cam before the insulation is displaced.
Figure 4:
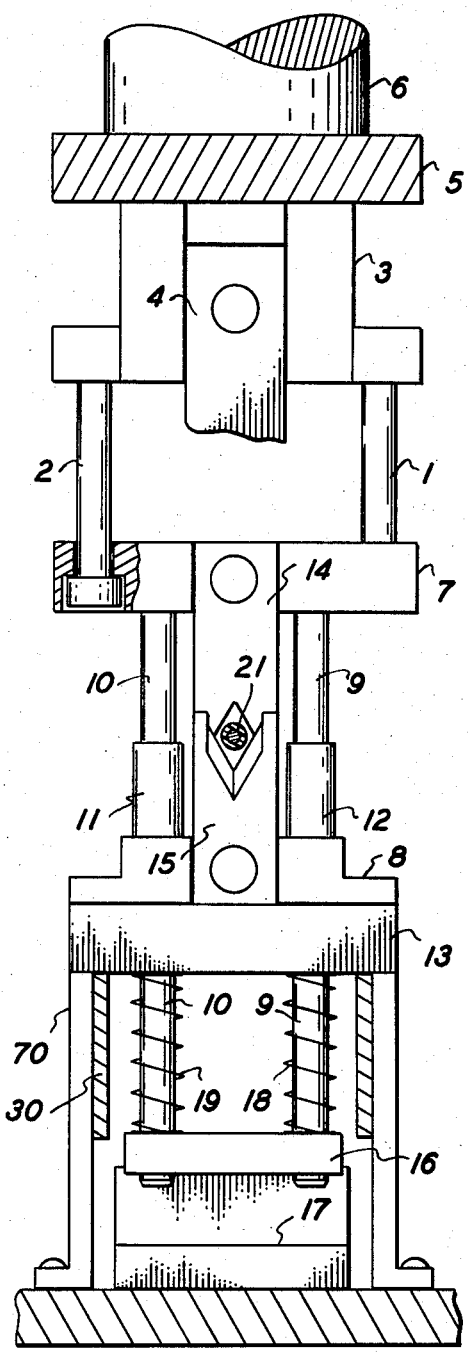
FIG. 4 is a side view of the wire stripping mechanism showing the position of the stripping blades before they reach the stripping position.

Referring to FIGS. 3 and 4 in conjunction with FIG. 2, ram 6 carries upper stripping blade 14, terminal shear blade 38, upper stripping die set 7 and lower stripping die set 8. Terminal shear blade 38 is used to cut the crimped terminal from the continuous strip of terminals 35. Ram 6 also carries upper die set 5 which holds crimping blade 4 through crimping blade tool holder 3. Crimping blade tool holder 3 has attached to it two lifting shoulder bolts, 1 and 2, which slideably hold upper stripping die set 7. Upper stripping die set 7 has two stripping die guide pins, 9 and 10, which move through two lower stripping die set guide bushings, 11 and 12. Stripping die guide pins 9 and 10 are attached to lower stripping die tie bar 16. Lower stripping blade 15 is mounted on lower die set/base plate 13. Plate 13 is supported by support members 70 attached to base 72. Two stripping die set compression springs, 18 and 19,are located between lower die set/base plate 13 and lower stripping die tie bar 16.

During its downward stroke, ram 6 causes the slicing of the insulation on the wire and forces stripping cam 23 to move. The action of ram 6 and stripping cam 23 ultimately displaces the insulation on wire 21, moves the terminal into the anvil area, crimps the terminal to the wire and severs the terminal from the strip. At the end of harness manufacture, it can also cut off the wire from the wire supply. The ram ascends to its original position after its downward stroke to complete its cycle. As ram 6 begins to move downward bringing crimping blade 4 with it, springs 18 and 19 force upper stripping die set 7 and upper stripping blade 14 downward also until the ends of stripping die guide pins 18 and 19 contact pull out block 17. In this position, the upper stripping blade 14 has been lowered around wire 21 to a position wherein it slices through the insulation on the wire but does not cut the conductor thereof. Although blade 14 and upper stripping die set 7 cannot travel any further, the ram is allowed to continue its downward motion beyond this position, thus carrying crimping blade 4 through its full crimping action. This occurs since lifting shoulder bolts 1 and 2 are allowed to slide within and relative to upper stripping die set 7.

The remaining elements shown in FIGS. 2, 3 and 4 include lower die set/base plate 13 which carries crimping anvil 68, wire feed tube 25, wire gripper anvil 26, wire gripper anvil support 28 and wire gripper plunger 27. Plunger 27 and anvil 26 are mounted on and move with stripping cam 23. Stripping cam 23 moves in accordance with stripping cam actuating roller 22 which is connected to ram 6. Stripping cam 23 pivots about stripping cam pivot 29 which is mounted on stripping cam pivot support 30. Wire gripper plunger 27 is activated by wire gripper air cylinder 24.

Before proceeding with the action of stripping cam 23, reference is made specifically to FIG. 3 which shows a front view of the wire stripping mechanism before the insulation is displaced on the wire. In this figure, the ram is in its uppermost position and the operations within the terminating station have not yet begun. It can be seen that while stripping cam 23 is in its upright position, plunger 27 is in its inactivated position so as to allow wire 21 to freely pass between it and anvil 26. In this view, wire is fed from wire feed tube 25 to the left for the next cycle of operation of the press. Upper stripping blade 14, because of the position of ram 6, is high over wire 21 as it comes out of the wire feed tube. This enables the free passage of the wire between blades 14 and 15 so that the insulation on the wire is not damaged during such feeding. Also in this position, springs 18 and 19 are in their fully compressed position so that when the ram begins to fall, they will pull upper stripping die set 7 down to the extent that the ram allows it to travel. Assuming that the operation occuring at the station at this particular time is that of attaching a terminal rather than cutting off the wire, pull out block 17 is positioned under the stripping die guide pins so that the latter will come to rest on top of the block during this cycle of the press. The action of pull out block air cylinder 20 will be described in connection with another drawing.

Reference is had to FIG. 4 which is a side view of the wire stripping mechanism before the ram cycle begins. The position of the wire stripping blades 14 and 15 can be seen here. Lifting shoulder bolts, 1 and 2, are free to ride relative to upper stripping die set 7 after stripping die guide pins 9 and 10 bottom out on pull out block 17. This permits upper stripping blade 14 and lower stripping blade 15 to sever or slice the insulation down to the conductor but not to cause any cutting action upon the conductor, per se. Once this position is reached and the ram continues through its downward portion of the cycle, bolts 1 and 2 begin to slide relative to upper stripping die set 7. This is because the die set at this point cannot drop any further. Hence, the height of pull out block 17 is crucial in terms of its thickness and should be matched to the amount of slicing required to get through the insulation in wire 21.

Figure 5:
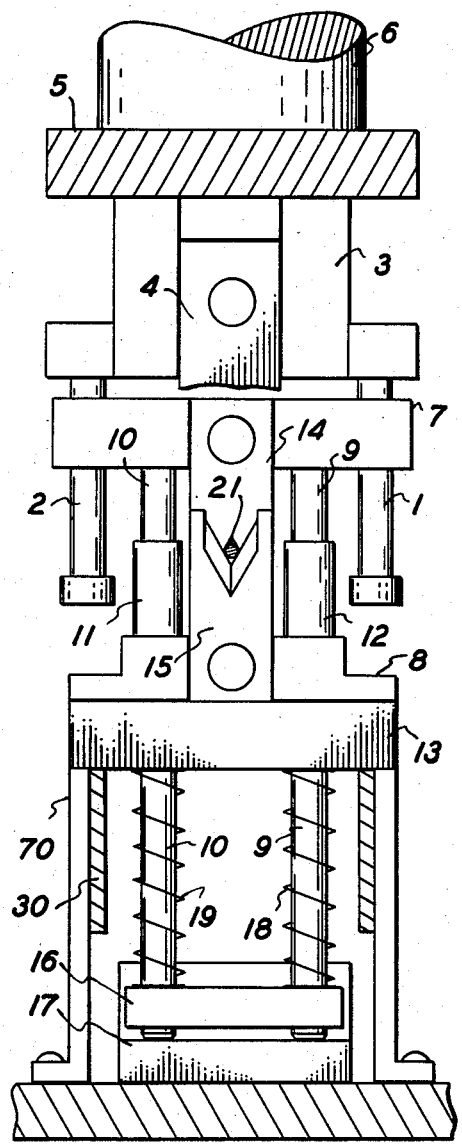
FIG. 5 is similar to FIG. 4 but the stripping blades have reached the stripping position although the insulation has not yet been stripped from the wire.

FIG. 5 is similar to FIG. 4 but depicts the mechanism after the stripping blades have bottomed out on pull out block 17. In this Figure, ram 6 is still moving in the downward portion of its cycle and shoulder bolts 1 and 2 have moved a fair distance relative to upper stripping die set 7. The ram's continuing downward movement enables the insulation to be stripped from the conductor and the terminal to be attached to the conductor once it is bared of insulation. Further downward movement of the ram causes the terminal to be crimped onto the conductor and severed from the terminal strip. This mechanism provides a smooth, well-timed sequence of events producing a terminal fastened to the conductor portion of the wire before it is moved out of the terminating station.

Figure 6:
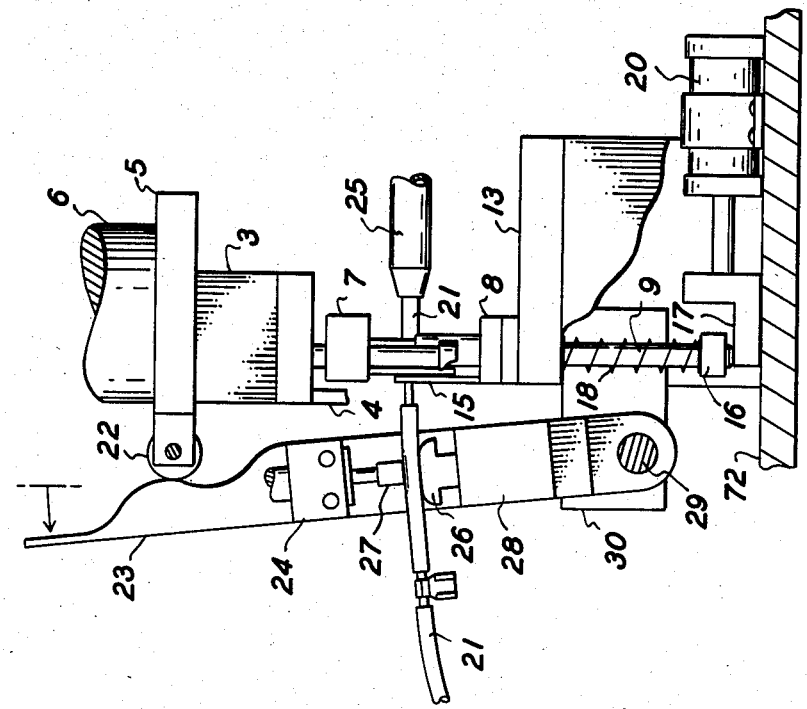
FIG. 6 is similar to FIG. 3 but the stripper cam is shown in its position after the insulation has been stripped from the conductor.

For a better view of the action on wire 21, reference is had to FIG. 6. Here the action of stripping cam 23 can be more fully appreciated. As ram 6 moves through the downward stroke of its cycle, stripping cam activating roller 22 forces stripping cam 23 to move to the left. Roller 22 is supported on upper die set 5 and stripping cam 23 rotates about pivot 29. The action of stripping cam 23 is determined by the contour of the upper portion of the stripping cam.

Prior to stripper cam 23 pivoting, plunger 27 is activated by air cylinder 24 enabling wire 21 to be firmly grasped between plunger 27 and anvil 26. Once the wire is firmly gripped by the anvil and plunger, the pivoting of stripping cam 23 in the counter clockwise direction forces wire 21 to be brought with it. However, at this time, upper stripping blade 14 and lower stripping blade 15 have already sliced through the insulation of the wire. Stripping cam 23 rotates to cause the insulation to be held back and displaced relative to the underlying conductor. This produces a bared portion of the conductor in the area of the crimping anvil. It is in this bared portion that the terminal is crimped onto the wire making a connection thereto without discontinuities in the conductor.

The full action of the mechanism upon the wire can be described as follows. Wire 21 is fed out of wire feed tube 25 through the space between stripping blades 14 and 15. Blade 14 is in its uppermost position consistent with the ram not yet beginning its cycle. The wire is fed through the space between plunger 27 and anvil 26 since the plunger also has not yet been activated. At this time stripping cam 23 is in the substantially vertical position due to the fact that the ram is in its topmost location. As the ram begins to fall thereby causing the insulation on the wire to be sliced, plunger 27 is activated and the wire is gripped between it and anvil 26. Cam follower 22 pushes stripping cam 23 in a counter clockwise direction, pulling the wire to the left in FIG. 6. The insulation on the wire immediately to the right of blades 14 and 15 is held on the right side of the blades as the wire is pulled to the left through the blades. The conductor of the wire under the insulation being displaced is bared as it is moved in this manner to prepare it for a terminal being attached. The terminal is crimped onto the bared portion of the conductor. The ram then starts its upward motion carrying follower 22 with it and allowing stripping arm 23 to come back to its vertical position by rotation in the clockwise direction. Before stripping cam 23 is allowed to move back into its vertical position, plunger 27 is released so that the wire portion gripped thereby is not dragged back with the stripping cam. Suitable biasing means are part of stripping cam 23 so that the cam is returned to the upright position as the ram moves up.

Figure 7:
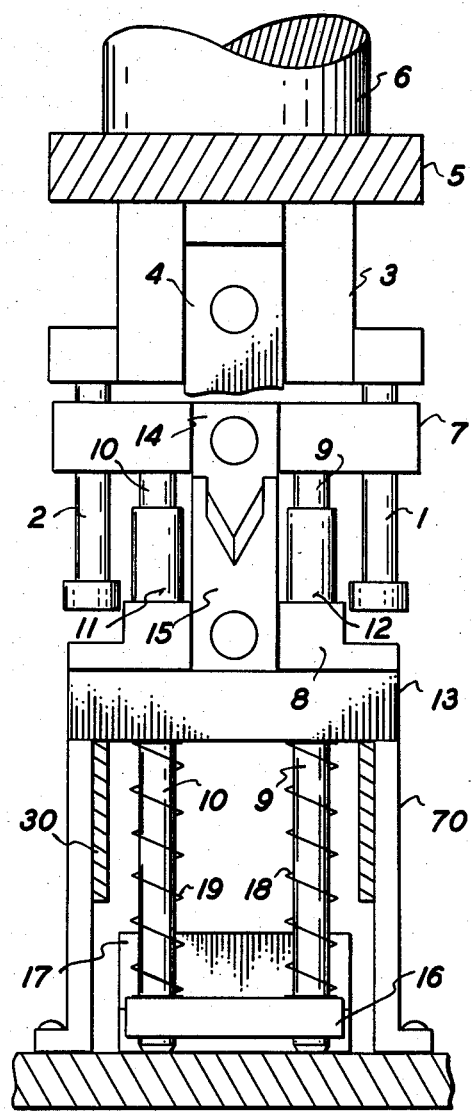
FIG. 7 is similar to FIG. 4 but the stripping blades are in their position just after cutoff of the wire has been completed.

Reference is now had to FIG. 7 which is similar to FIG. 4 but depicts the blades and associated mechanism in the cutoff or wire severing position. The purpose of this action by the blades is to sever the entire wire, conductor and insulation, after the harness is completed and it is to be cutoff from the wire supply. This action is one manner in which the harness-making cycle can be completed. The cutoff action is accomplished by the downward stroke of ram 6 as described in conjunction with earlier figures. The main difference is that upper stripping blade 14 is allowed to drop lower than it is in a normal insulation displacing action so that it, in conjunction with lower stripping blade 15, cuts completely through the wire. This is allowed to happen by removing pull out block 17, shown in FIG. 6, from its position underneath stripping die guide pins 9 and 10. With the pull out block removed, the stripping die guide pins are allowed to travel all the way down to base 72 of the machine and through full travel equivalent to the thickness of pull out block 17. This allows upper stripping die set 7 to travel an equivalent further distance down, actually being pulled by springs 18 and 19. This additional distance of travel enables blade 14 to close completely on blade 15 and make a total cutoff of the wire during the cycle.

Reference is now made to FIG. 8 which is a top view of the wire feed length control station and the wire feed station, and FIG. 9 showing the details of the wire feed mechanism. The wire, shown only in FIG. 9, is fed from its supply reel into the rear opening of a stationary carrier device, feed tube 42, through the tube and to the terminating station. As can be more clearly seen in FIG. 9, rod 66 is adapted to reciprocate relative to wire feed double-ended air cylinder 45. It is through this reciprocating action that wire is fed in pre-selected lengths to the terminating station. Rod 66, moved by the piston of air cylinder 45, extends through both ends of the cylinder. If greater positive pressure is placed on the left side of the cylinder chamber, the rod moves to the right. Conversely, if greater positive pressure is placed on the right side of the cylinder chamber, the rod moves to the left.

Front feed block 43 is adapted to slide relative to rear feed block 44 and slotted wire feed tube 42. This motion is dictated by front feed block 43 being mounted to the forward or right-end of the air cylinder rod 66. Thus, as rod 66 is reciprocated to and fro by air cylinder 45, front feed block 43, which is attached to rod 66, will be carried along with it. Wire 21 is held relative to feed block 43 when the front feed block moves forward, or to the right, toward the terminating station due to the fact that the upper front feed pawl 40R holds it tightly. Pawl 40R holds wire 21 against lower feed pawl 41 and the rear feed pawl 40L does not grip wire 21 during the forward movement due to ratchet-like nature of operation of back feed pawl 40L. Pawls 40R and 40L are biased by any suitable means, such as a spring, into the clockwise direction as viewed in FIG. 9. Looking down on the feed tube, as in FIG. 8, it can be seen that the feed tube has slot 67 through which pawls 40L and 40R act directly upon wire 21. There is a similar slot in the bottom of the feed tube, although not visible, through which lower pawl 41 contacts the wire.

As rod 66 is moved to the left by air cylinder 45, front feed block and pawl 40R move with it. No wire is taken into the feed tube during back motion of block 43. This is because wire 21, during this left or back motion of front feed block, is being held firmly at block 44 via pawl 40L. Wire 21 is held stationary at block 44 while front feed block 43 moves left relative to the wire due to the ratchet-like nature of front pawl 40R. Thus, front pall 40R is allowed to pivot away from the wire when block 43 moves to the left allowing the wire to slip relative to front pawl 40R, lower pawl 41 and feed block 43. On the forward or right return stroke, however, the wire is firmly gripped by front pall 40R against lower pawl 41 and slips relative to rear pawl 40L. Wire 21 is carried to the right or forward when rod 66 carries front feed block 43, front pawl 40R and lower pawl 41 to the right. This latter action is actually the wire feeding stroke bringing the next length of wire through the terminating station. The movement of rod 66 is dictated by any suitable air valve 69. An example of such an air valve is model number 375-02-001-37 from catalogue number OMNI 3753M supplied by I.S.I. Fluid Power, Inc., of Fraser, Minn. This is referred to as a four-way solenoid air pilot-operated valve.

FIG. 8 also shows the mechanism by which the wire feed length is controlled. Cap 54 is pushed into the area of this station as air cylinder 45 drives it back, or to the left, with rod 66. The length of wire 21 to be fed is controlled by the distance that cap 54 is allowed to travel into the wire feed length control station. The control station contains a number of solenoids, 47 through 53. These solenoids control the position of the related gate assemblies 56–62, respectively. The gate assemblies are biased to one side, downward in FIG. 8, by springs 55 while the solenoid is inactivated. The gate assemblies and springs are mounted on base plate 63 and the solenoids are mounted on base plate 63 and solenoid support 64.

Each gate assembly contains a gate between the solenoid and spring that is movably supported in members 65. Springs 55 bias the gates into the inactivated position. Each assembly 56–62 contains a gate having an opening in one limited section thereof. In the normal position, or inactivated state, the gate openings are aligned with the travel of cap 54 and allow the cap to pass therethrough. However, when a solenoid is activated, such as shown in the case of solenoid 49, the gate assembly is activated and the gate is moved to a position wherein the opening is offset from the path of cap 54. When the gate assembly is in the activated state, the gate forms an obstruction to cap 54's travel to the left, thereby limiting the travel of the cap. FIG. 8 shows the cap's length of travel limited by solenoid 49 being activated and its associated gate forming an obstruction to the cap. In this way, the length of the rearward stroke of rod 66 is controlled by simply activating one of the solenoids according to the length of wire that is to be fed to the terminating station. The limit on the rearward travel of rod 66 also limits that of block 43.

Figure 10:
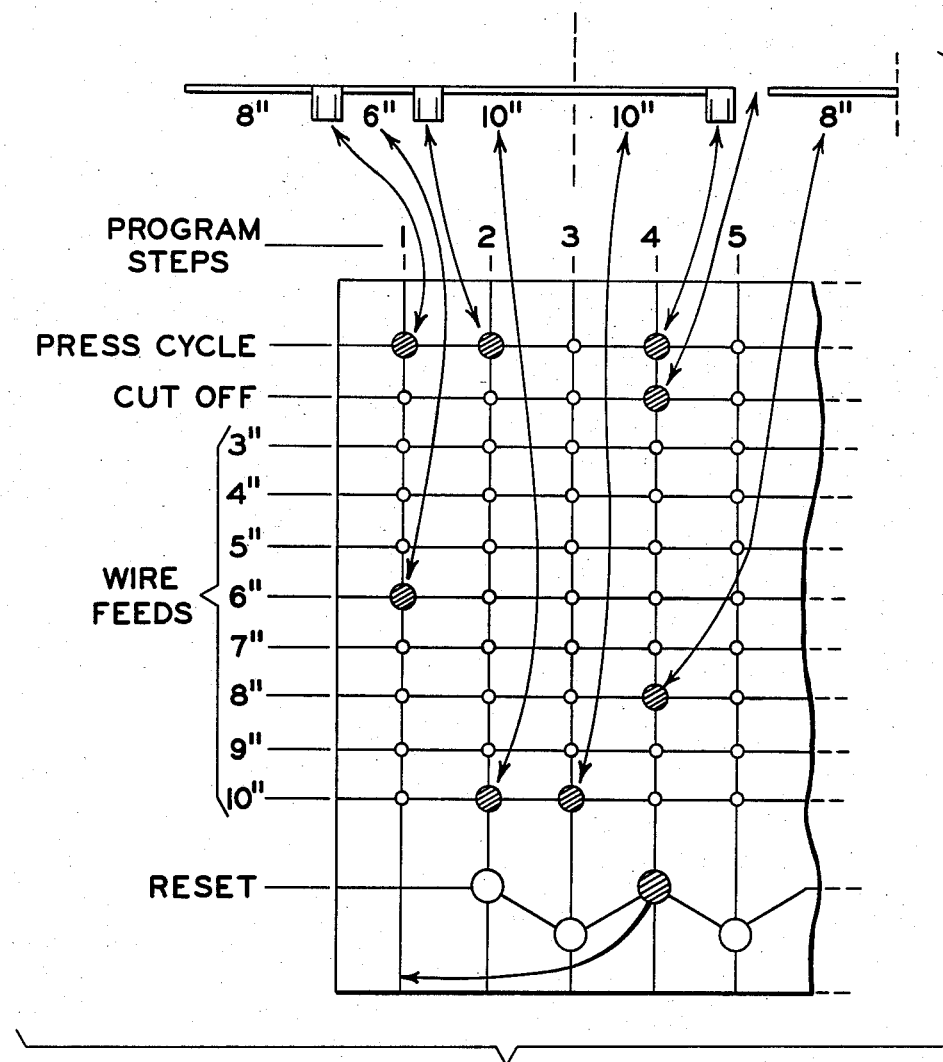
FIG. 10 is a schematic illustration of the pin-programmable matrix board contained in the control panel.

The control panel contains a program module which includes a pin-programmable matrix board operatively connected to a solid state stepping switch. By this or other suitable means, a wide variety of harness configurations may be produced simply by plugging program pins into the matrix board at the appropriate locations. FIG. 10 is a representation of a typical set up of the pin-programmable matrix board to produce a wire harness of predetermined configuration. The configuration is schematically shown above the matrix board in FIG. 10.

Any suitable matrix board would be adaptable to the control panel. One example is a ten-hole by ten-hole matrix programming and switching system, Part No. 070-101-0600-600, sold by Sealectro Corporation, Mamaroneck, N.Y., shown in their Catalogue No. 5B0180-10M. A stepper can be used in conjunction with the pin-programmable matrix board to operate through the pin-matrix program. Any type of suitable stepper for this purpose can be used such as the solid-state logic stepper with 10 positions and a reset function supplied by Guardian Electric Manufacturer, Torrance, Calif., known as Part No. SLS-110-2A112.

The control panel also contains a mode selector switch to allow either (1) one-step mode, (2) one-cycle mode or (3) continuous cycle mode. This can be any suitable three-position switch. The mode selector, especially the addition of modes (1) and (2), is particularly useful in setting the syytem up with a new harness configuration. The harness can be "built" in steps with the use of these controls before placing the system in a continuous production mode, or mode (3). Also included in the control panel are suitable switches for starting and stopping the program machine cycle, main power on/off buttons and status indicator lamps. The following will illustrate in more detail the various program functions which will be described in order of increasing complexity.

When the selector is placed in mode (1), single-stepping through the program is performed and the system operates as follows. When the cycle start button is pressed, wire feed block 43 retracts or moves to the left in FIGS. 8 and 9. The block reverses direction when the programmed length is obtained and the wire is gripped by pawls 40R and 41. As block 43 begins to move to the right, wire is fed into the terminating station until the block reaches itsforward position. At the beginning of the forward stroke the stepper switch transfers power to the next column of the matrix board. The sequence repeats each time the cycle button is pressed until the last column is reached after which the stepper resets to the first column.

When the selector switch is placed into mode (2) and the cycle start button is pressed, the machine will produce one complete harness by automatically going through the individual steps described above. The feed block then stops in its forward position and remains there until the next time the cycle start button is pressed.

When the selector is placed in mode (3), continuous harness production is achieved. When the cycle start button is pushed, the feed mechanism will keep cycling as described above but will not stop automatically after the stepper resets. When the cycle stop button is pushed the feed mechanism and steper will continue operating until reset occurs after which feed block 43 stops in its forward position until the cycle start button is again pushed. When a reset pin is inserted into the matrix board at the intersection of a reset line and given column, as shown in FIG. 10, reset to the first column will occur after the stepper reaches the column with the reset pin. All remaining columns are skipped when a reset pin is reached.

The pins can also be used to control feed length. When pins are used in the feed length lines of the matrix board, the solenoids are actuated to shorten the stroke of the wire feed block. Thus, for example, if a 6 inch feed is desired at a particular location on the harness, a pin is inserted at the intersaction of the 6 inch line and the appropriate column. When that column is reached, the 6 inch gate assembly 58 is activated in the wire feed length control station thereby limiting the block and the wire feed length to 6 inches. Should a feed length be required that is longer than the maximum cylinder stroke, successive strokes are programmed to add to the desired feed length. A 15 inch feed, for instance, would be obtained by programming two successive strokes of 7 or 8 inches or any combination adding up to 15 inches.

In conjunction with the wire feed, a terminating machine press, such as that shown in FIG. 2, is programmed to operate when a terminal is to be applied to the harness. When a column is reached having a pin in the press cycle line, the press is triggered when the wire feed block reaches its forward position. As the press crank shaft begins to turn, control of the machine is taken over by a series of timing cams on the crank shaft. There are three cams on the crank shaft of the press and each has an associated valve follower or switch assembly which is activated by the cams. A first cam controls the timing of the wire feed block forward or feeding stroke. A second cam controls the timing of the activation of plunger 27. A third cam controls the removal of pull out block 17 and the cutoff operation. As the press ram starts down, the stripper blades cut through the wire insulation to a depth controlled by guide pins 9 and 10. Plunger 27 is activated to grip the wire and roller 22 mounted on the ram operates against the surface of stripping cam 23 to rotate the stripping cam to displace insulation on the wire.

A terminal is fed into position and rests on the crimping anvil directly beneath the section of bare conductor. The wire is brought down into the crimping position near the bottom of the ram stroke. The wire gripper releases and the first terminal is cut from the strip and crimped to the section of the conductor where the insulation is displaced. During the return stroke of the ram, the wire and terminal are lifted off the anvil and the wire feed block starts its forward stroke thereby feeding the attached terminal out of the crimping area. During a press cycle, the wire feed block retracts as usual, but it is held in its rear position by the action of the switch operated by the first cam in the press until after crimping is completed.

Wire cutoff control is now described with reference to FIG. 10. When a pin is inserted at the intersection of the cutoff line in a column which has been programmed for a press cycle, the press operates as described above to perform the cutoff operation. A solenoid controlled air valve admits compressed air to the input of an air valve operated by the third cam in the press. This valve operates an air cylinder which removes the pull-out block from under the stripping die guide pins 9 and 10 during the cycle of the ram. This allows the upper stripper blade to travel down an additional amount of distance causing the stripper blades to act as a wire cutter.

The following is a step-by-step description of what happens in the harness making system in reference to the programs set up as described in FIG. 10. The predetermined harness configuration manufactured by the matrix set up shown is schematically illustrated just above the matrix board in FIG. 10. The machine cycle is brought to the following condition initially. The power is turned on and the mode selector is placed to mode 2. This means that the system will go through one complete cycle of making a full harness. If this program has been operated through at least one cycle before and wire extends from the wire supply to the press, an 8 inch section extends beyond the press to form the 8 inch leader shown. If, on the other hand, this were an initial run with this program, the operator would have to make certain that a lead wire was brought from the wire supply through the feed tube and to the terminating station. To assure proper lead length, a wire protruding 8 inches beyond the stripper blades is placed into the terminating station. This, of course, is obtained automatically after the first cycle and is set at the matrix board by the pin placed in the 8 inch line at program step 4.

The scanner reads out step 1 when the cycle start button is activated. The press is activated due to a pin being located in the press cycle line at column 1. The press applies the first terminal as described herein and the wire is fed six inches and the stepper advanced to column 2. During wire feed, the portion of the wire now having the first terminal attached to it is fed out of and beyond the press area. At the end of feeding, the first terminal is 6 inches beyond the press.

As soon as the wire feed is completed, the press cycle for column 2 is commenced and the second terminal is applied to the wire. After the second terminal is attached, the wire is fed another 10 inches in accordance with the location of the pin on column 2 and the scanner is advanced to column 3. At column 3, the wire is fed another 10 inches and the stepper brought to column 4. Here it can be seen that the distance between the terminals is 20 inches and two wire feed steps are used to bring about this length between the second and third terminals.

The scanner reads column 4 and the third, or last terminal programmed is applied to the harness and the wire is cut. Cutting is dictated by the pin located in column 4 on the cutoff line of the matrix. Also, the wire is fed an additional 8 inches to provide the lead for the next harness to be made, the scanner is reset to column 1 and the machine cycle is stopped.

If the mode selector were set on mode 3, the same cycling would occur as described above except that there would be no stopping when reset returned the scanner to step 1. Instead, the scanner would continue reading each of the columns making another complete harness and this would continue until the system were stopped manually. If the mode selector were set on mode 1, only one column's worth of operations would be carried out before the system stopped. In order to get the system to carry out the operation of the next column, the operator would have to push the start button again. The reactivation of the start button would be necessary for each succeeding column until the harness is completed in this mode.

The control panel is electrically connected to the press, wire feed station and wire feed length control station. Each wire feed line of the matrix module represents a particular desired length of the wire to be fed. Each of these lines is electrically connected to one of the solenoids 47-53 so that when read by the scanner, the proper solenoid is activated and its stop block limits the travel of cap 54. In this manner, wire length is controlled column by column on the matrix board.

When wire feed cylinder 45 piston stops at its retracted position, as shown in FIGS. 8 and 9, the air pressure on the left side of the piston drops. This pressure drop is sensed by a pressure switch 97, which energizes a solenoid on air valve 69. Valve 69, in turn, creates a greater positive pressure on the left side of air cylinder 45 piston, causing feed block 43 to move to the right, or forward direction, to feed wire. Pressure switch 97 also sends a signal to advance the stepper to the next column.

At the end of the wire feeding, or forward, stroke block 43 activates another switch 98 which is connected to air valve 69. Upon receiving this signal, the air valve causes a greater positive pressure on the right side of air cylinder 45 piston, causing the piston to move rod 66 to the left.

If a press cycle has been programmed, a signal from switch 98 actuated by block 43 also causes the press to be triggered. When wire feeding block 43 reaches its retracted position, as determined by the pin in the matrix board and its associated stop block, it is held there until the first cam in the press activates its associated switch. This switch, in turn, supplies power to pressure switch 97 enabling the wire feed cylinder to start its forward stroke. This arrangement prevents the feeding of wire before the press ram has risen sufficiently to provide a clear path for the wire.

The press ram is normally in its uppermost position, and the press controls are electrically connected to the control panel. When a column is scanned and a press cycle pin is present, the press is activated. As the ram descends, wire gripper air cylinder 24 is activated by the second cam to close plunger 27 on the wire. The blades slice the insulation on the wire and stripper cam 21 pivots displacing the insulation thereby baring the conductor on the wire. The ram descends to crimp the first terminal to the wire and sever the first terminal from the strip of terminals. After crimping is completed, the second cam then deactivates plunger 27 and the ram begins to ascend. The first cam activates its associated switch enabling the feed block to move forward delivering another section of wire to the press.

The third cam and its associated valve enables the cutoff system to be activated on each cycle of the press. However, a switch associated with the operation of air cylinder 20 must also receive a signal from the control panel that cutoff is programmed before cutoff is actually allowed to occur. The deactivation of air cylinder 20, which places pull out block 16 back under stripping die guide pins 9 and 10 is controlled by the third cam during the ascending portion of the rams cycle.

The control functions described above can alternatively be carried out by other control devices such as microprocessors. In addition, other modifications can be made such as locating the various elements of the system separately or in different combinations than that described in the particular embodiment disclosed. Modifications can also be made to the embodiment described to displace the insulation but not attach a terminal. This can be accomplished, for instance, by controlling the terminal feed electrically rather than mechanically and connect it to a suitable line in the matrix board where the step can be programmed. Also, different types and sizes of terminals can be crimped onto a harness wire at various locations. This can be accomplished by providing a press adapted to feed two or more types of terminals to the terminating station. The matrix board can be programmed to select among particular types of terminals for each press cycle.

It should be understood that the foregoing description is only illustrative of the invention. Various alternatives and modifications in the structural and functional features of the electrical harness manufacturing method and apparatus can be devised by those skilled in the art without departing from the invention. Accordingly, the present invention is intended to embrace all such alternatives, modifications and variations and fall within the spirit and scope of the appended claims.

What is claimed is:

1. A process for producing an electrical harness comprising a plurality of electrical terminals sequentially connected along a length of insulted wire comprising:
   providing a work station for use in attaching a terminal to the underlying wire conductor;
   sequentially positioning terminal devices in operative position relative to the work station;
   axially pushing a predetermined length of insulated wire conductor in a desired direction past the work station from a source of said conductor;
   cutting and holding back the insulation of the wire without severing the underlying conductor at a point adjacent the work station;
   gripping and pulling the wire, insulation and conductor, a disired amount in said desired direction through the work station in response to the cutting and holding back of the insulation such that the wire insulation upstream of the cutting of the wire is axially displaced and held back by the cutting step to expose the underlying ire conductor at the work station; and
   attaching a terminal device to the exposed underlying wire conductor at said work station while said insulation is held back by said cutting step.

2. A process as in claim 1 further including the steps of:
   removing the completed harness from the work station; and
   controlling the steps of sequentially positioning terminal devices, axially pushing said insulated wire, cutting the insulation of the wire, displacing the insulation of the wire, attaching the terminal to the underlying conductor and removing the completed harness so that a harness completed in accordance with a predetermined configuration is manufactured automatically.

3. A process as in claim 2 wherein said step of removing said completed harness from said work station includes the step of severing said harness from said wire supply.

4. A process as in claim 2 wherein said step of removing said completed harness from said work station includes the step of winding said harness upon a reel.

5. A process as in claim 1 wherein said cutting step comprises providing upper and lower blades and wherein said cutting step comprises a first mode of operation adapted to slice through the wire insulation while keeping the wire conductor in tact.

6. A process as in claim 5 wherein said cutting step comprises a second mode of operation adapted to completely sever the wire thereby separating the completed harness from the wire supply.

7. A process as in claim 2 wherein said control step comprises preprogramming so that a desired harness configuration can be manufactured.

8. A process as in claim 7 wherein said control step comprises three modes of operation comprising:
   a one step mode wherein said process is carried out in increments less than a complete cycle for producing said harness;
   a one cycle mode wherein a complete harness manufacturing cycle is carried out; and
   a continuous cycle mode wherein a plurality of harnesses are manufactured continuously by sequentially carrying out a plurality of harness manufacturing cycles; said control step further comprising the step of selecting one of said three modes of operation.

9. An apparatus for producing an electrical harness comprising a plurality of electrical terminals sequentially connected along a length of insulated wire comprising:
   a work station for use in attaching a terminal to the underlying wire conductor; means associated with said work station for sequentially positioning terminal devices in operative position relative to the work station;
   pushing means operatively associated with said work station for axially pushing a predetermined length of insulated wire conductor in a desired direction past the work station from a source of said conductor;
   cutting means operatively associated with said work station for cutting the insulation of the wire without severing the underlying wire conductor and for holding back the insulation during attachment of a terminal device to the underlying wire condutor;

gripping and pulling means operatively associated with the said work station and responsive to the movement of said cutting means toward the wire for gripping and pulling the wire, insulation and conductor, a desired amount in the said desired direction through said work station such that the wire insulation upstream of said cutting means is axially displaced and held back by said cutting means to expose the underlying wire conductor at said work station; and means at said work station for attaching a terminal device to the exposed underlying wire conductor while said insulation is held back by said cutting means.

10. An apparatus as in claim 9 wherein said gripping and pulling means for moving said wire, insulation and conductor, said desired amount comprises:

gripper means for gripping the wire at a point spaced from said cutting means and downstream thereof, and means for moving said gripper means while it is gripping said wire away from said cutting means.

11. An apparatus as in claim 9 further including means operatively associated with said work station for removing the completed harness from said work station; and means operatively associated with said work station for controlling the operation of the terminal positioning means, the pushing means, the cutting means, the gripping and pulling means for pulling the wire to displace the wire insulation, the attaching means and the removing means so that a harness completed in accordance with the predetermined condiguration is manufactured automatically.

12. An apparatus as in claim 11 wherein said means for removing the completed harness from the work station includes a severing means operatively associated with said work station for separating the harness from the wire supply.

13. An apparatus as in claim 11 wherein the means for removing the completed harness from the work station includes a reel means operatively associated with said work station upon which the harness is wound.

14. An apparatus as in claim 9 wherein the cutting means includes upper and lower blades operatively associated with said work station having a first mode of operation adapted to slice through the wire insulation while keeping the wire conductor intact.

15. An apparatus as in claim 14 wherein said upper and lower blades have a second mode of operation adapted to completely sever the wire thereby separating the completed harness from the wire supply.

16. An apparatus as in claim 11 wherein the control means is programmable whereby a variety of harness configurations can be manufactured by preprogramming the apparatus.

17. An apparatus as in claim 16 wherein said control means is adapted to carry said programs in three modes of operation comprising:

a one step mode wherein a harness manufacturing cycle is carried out in increments of less than one cycle;

a one cycle mode wherein a single complete harness manufacturing cycle is carried out; and a continuous cycle mode wherein a plurality of complete harness manufacturing cycles are carried out in a continuous manner.

18. An apparatus as in claim 17 wherein said control means comprises a pin programmable matrix board means operatively associated with said work station for programming a desired harness configuration; and a solid state stepping switch scanning means operatively associated with said work station for implementing the program of said pin programmable matrix board; and a mode selector switch for selecting said one step mode, said one cycle mode, or said continuous cycle mode.

19. An apparatus as in claim 9 wherein the pushing means for pushing the wire includes a reciprocating wire feed means, a wire feed length control station adjacent thereto and reciprocating rod means therebetween, all operatively associated with said work station, one end of the rod means controlling the stroke of the wire feed means and the other end of the rod means being controlled as to its length of reciprocation by the wire feed length control station, whereby the wire feed means feeds the length of wire depending upon the setting of the wire feed length control station.

* * * * *